United States Patent [19]

Fulkerson

[11] 4,291,780
[45] Sep. 29, 1981

[54] APPARATUS FOR WIRES IN THE GROUND
[76] Inventor: Earl Fulkerson, 4917 3A Street E, Gulf Lake Estates, Bradenton, Fla. 33507
[21] Appl. No.: 112,394
[22] Filed: Jan. 15, 1980

Related U.S. Application Data

[63] Continuation-in-part of Ser. No. 11,875, Feb. 13, 1979, Pat. No. 4,244,437.
[51] Int. Cl.³ .................... G01V 1/147; G01V 1/047
[52] U.S. Cl. .................... 181/121; 181/114; 181/401; 367/75; 173/39; 173/86; 173/131
[58] Field of Search .................... 181/114, 121, 401; 367/75; 173/39, 42, 86, 89, 128, 131

[56] References Cited

U.S. PATENT DOCUMENTS

| | | | |
|---|---|---|---|
| 2,990,022 | 6/1961 | Muller et al. | 173/39 |
| 3,088,385 | 5/1963 | Dorkins et al. | 173/86 |
| 3,393,763 | 7/1968 | Sundt | 181/114 |
| 4,059,820 | 11/1977 | Turpening | 367/75 |
| 4,064,964 | 12/1977 | Norden | 181/114 |
| 4,118,994 | 10/1978 | Layotte et al. | 181/121 |

*Primary Examiner*—Howard A. Birmiel
*Attorney, Agent, or Firm*—Charles W. Chandler

[57] ABSTRACT

A mobile generator for producing seismic waves in the ground, which includes a mobile four-sided frame, a boom having its lower end pivotally connected to the frame, and a worm gear mounted on the frame such that by rotating the worm gear about its longitudinal axis, the boom is pivoted toward a selected impact position. A hammer, mounted on the boom, is raised and then dropped toward an anvil carried beneath the frame on the ground. The anvil has several impact-receiving surfaces such that either a P wave or a shear wave can be generated by pivoting the boom and without relocating the anvil.

The anvil structure is positioned on the ground by applying a major portion of the weight of the apparatus on the anvil plate.

2 Claims, 4 Drawing Figures

4,291,780

APPARATUS FOR WIRES IN THE GROUND

CROSS-REFERENCE TO RELATED APPLICATION

This application is a continuation-in-part of my co-pending application, Ser. No. 11,875 filed Feb. 13, 1979 for SEISMIC WAVE GENERATOR now U.S. Pat. No. 4,244,437 issued Jan. 13, 1981.

BACKGROUND OF THE INVENTION

Seismic wave generators are useful for determining underground structure for a variety of reasons. For example, for burying radioactive waste, chemical wastes, and other materials it is necessary to obtain information regarding the underground structure.

SUMMARY OF THE INVENTION

The broad purpose of the present invention is to provide an improved mobile seismic wave generator in which a hammer is dropped along a boom to strike an anvil mounted on the ground, the position of the boom with respect to the ground being defined by a horizontal worm which is rotated about its axis to pivot the boom toward a selected impact position.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
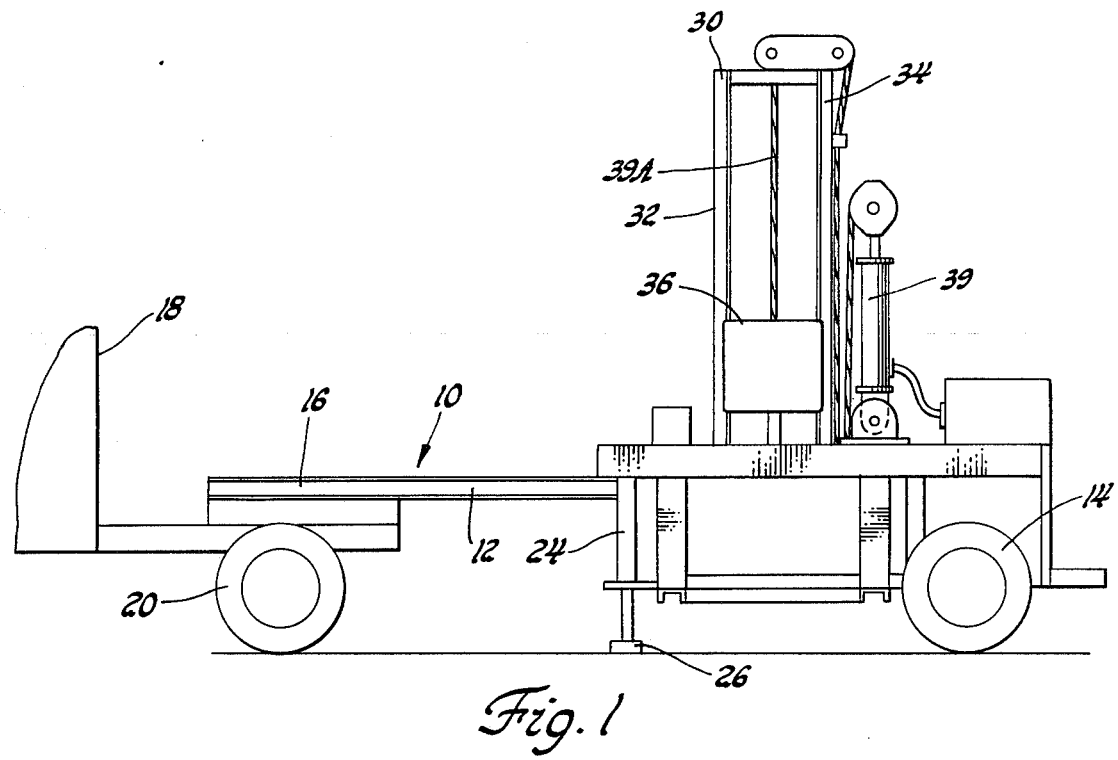
FIG. 1 is a side elevational view showing a preferred seismic wave generator.

Referring to the drawings, FIG. 1 illustrates a trailer, generally indicated at 10, having a four-sided frame 12 mounted on a pair of spaced, ground-engaging rear wheel means 14. A tongue 16, carried on the forward end of the frame, is connected to a tractor 18 having ground-engaging wheel means 20. Wheel means 14 and 20 support frame 12 from which a seismic wave is to be generated. A pair of spaced hydraulic piston means 24 (only one shown) are carried on frame 12 and have feet 26 engageable with the ground to support the frame. Piston means 24 may be fully extended to raise wheel means 20 off the ground. This is a useful function where the wheels become mired in soft ground.

Boom means 30 are mounted on frame 12 and include a pair of spaced parallel legs 32 and 34 supporting a weight 36. A hammer 38 is carried below the weight. The weight is slidably mounted on legs 32 and 34.

Power means 39 are mounted on the frame for actuating cable means 39A which is connected to the boom and to the weight such that it and the hammer can be raised toward the upper end of the boom.

Figure 2:
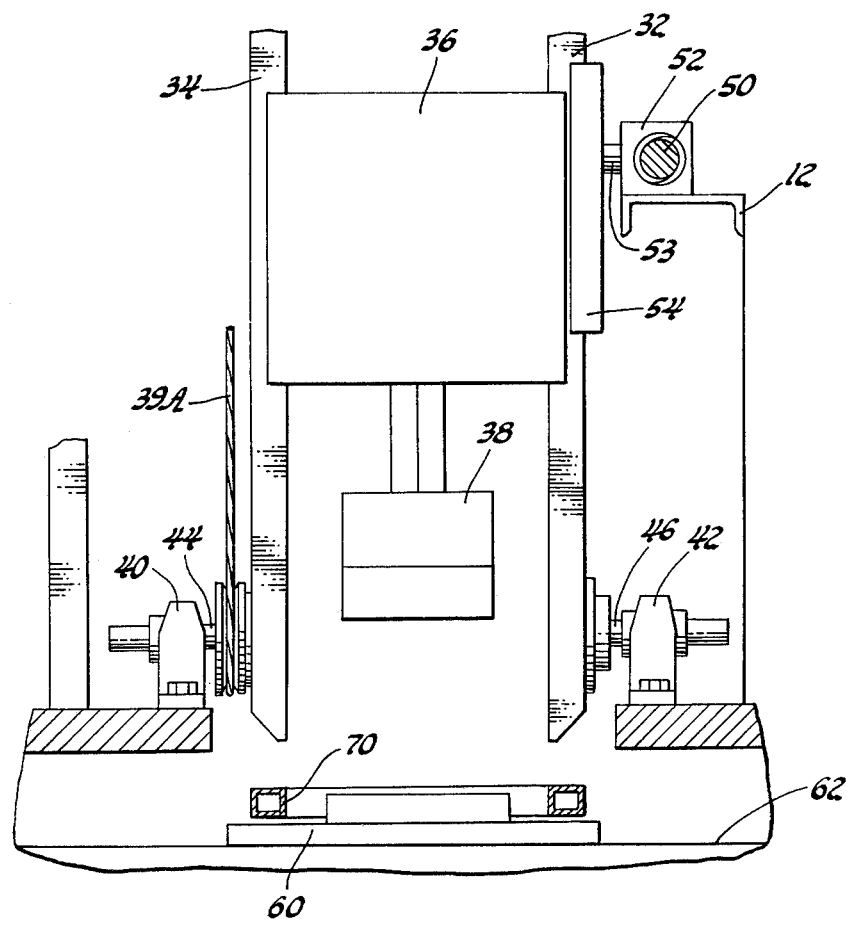
FIG. 2 is a fragmentary view illustrating the boom and its relationship to the hammer and the anvil.

Referring to FIG. 2, a pair of bearings 40 and 42 are mounted on the frame and support a pair of aligned shafts 44 and 46. The lower end of boom legs 32 and 34 are mounted on shafts 46 and 44, respectively, so that the boom may be pivoted about the shafts.

The lower end of the boom is disposed adjacent the ground between the ground engaging wheels 14 and hydraulic feet 26.

Figure 3:
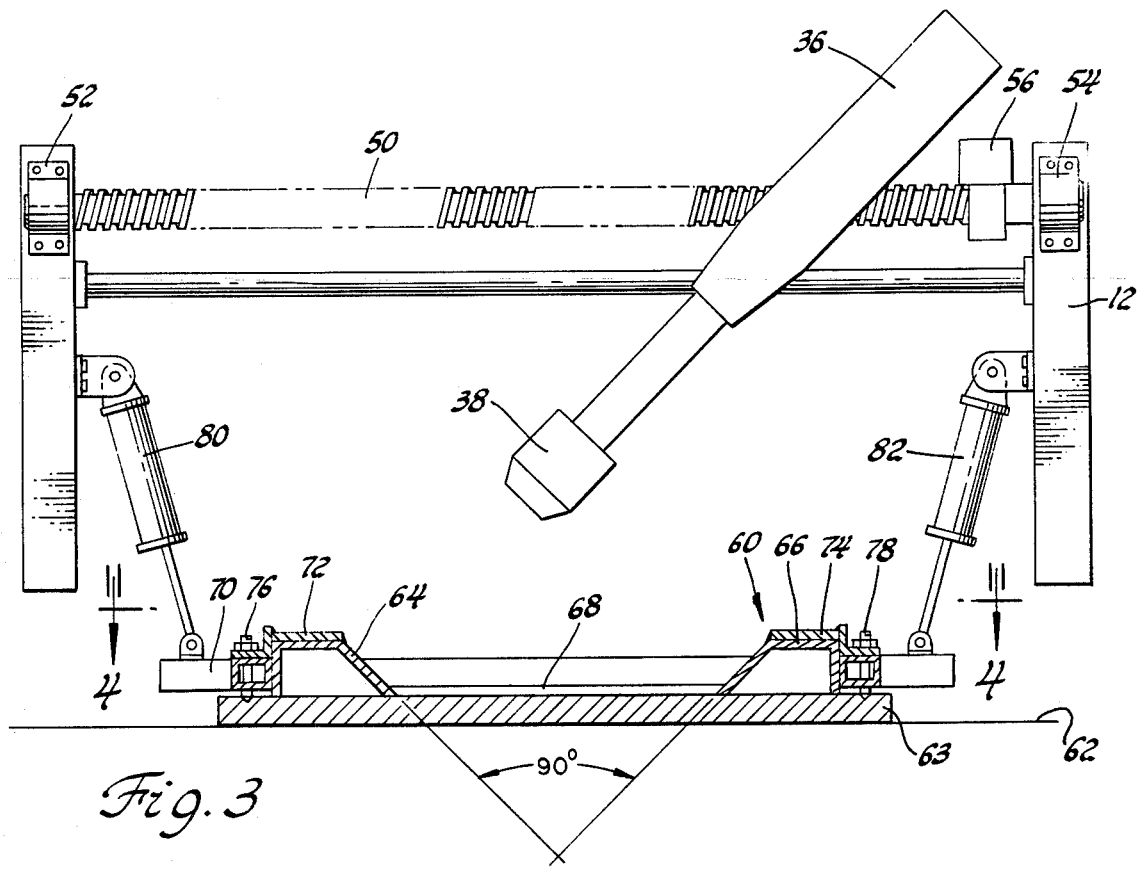
FIG. 3 is a fragmentary view at generally right angles to FIG. 2 to show the manner in which the boom is pivoted on the frame.
Figure 4:
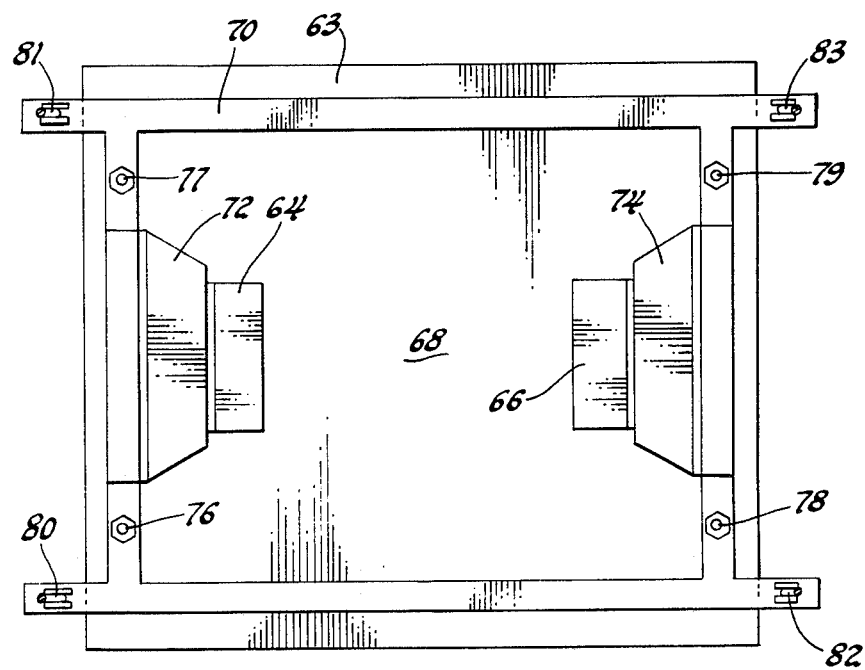
FIG. 4 is a view as seen along lines 4—4 of FIG. 3.

Referring to FIGS. 2 and 3, an elongated worm gear 50 is supported by bearings 52 and 54 on frame 12 so as to be rotatable about its longitudinal axis. Hydraulic motor 56, mounted on the frame, is drivingly connected to the worm to rotate it. A block 52 is slidably mounted on the worm and connected by swivel means 53 to a support 54 that is slidably mounted on boom leg 32 in such a manner that as the worm is rotated, block 52 is moved horizontally in a direction depending upon the direction of rotation of the worm. The support in turn pivots the boom about shafts 44 and 46.

An anvil 60 is disposed on ground 62 beneath frame 12. Anvil 60 includes a plate 63. A first impact-receiving structure 64 is attached to plate 63 and has an impact-receiving surface disposed at 45° with respect to the plate. A second impact-receiving structure 66 is attached to plate 63 and has an impact-receiving surface disposed at a 90° angle with respect to the impact-receiving surface of structure 64, and at a 45° angle with respect to the plate. The two impact-receiving structures are spaced on opposite sides of a midsection 68 which provides a third impact-receiving surface when the boom is disposed in a vertical position.

The boom is supported such that it can be pivoted to a perpendicular position with respect to each of the three impact-receiving surfaces.

A frame 70 is mounted on the anvil and has a pair of angles 72 and 74 seated on impact-receiving structures 64 and 66, as illustrated. Bolt means 76, 77, 78, and 79 connect the frame to the anvil plate. However, frame 70 is spaced about a half inch above the plate to permit angles 72 and 74 to be seated on the two impact-receiving structures.

Four hydraulic cylinder means 80, 81, 82 and 83 are connected to frame 12 adajcent the four corners of frame 70. Each cylinder means is connected by a piston rod to a corner of frame 70 so that the user can impose a downward pressure on the anvil. The cylinders are inclined with respect to the anvil plate to present it from slipping sideways when the anvil is being struck at an angle. The four cylinder means apply a downward pressure on the anvil plate of approximately 80% of the weight of the apparatus, about eight thousand pounds, leaving the balance of the weight of the apparatus being supported by feet 26 and wheel means 14 to stabilize the apparatus when being used in a shear wave position. The angles 72 and 74 are seated on the anvil to force it down toward the ground but to permit a slight amount of relative motion at such time as the hammer engages the anvil.

The lower surface of the anvil plate is shown smooth. However, it may have a corrugated structure as illustrated in my co-pending application, depending upon the nature of the soil.

When the apparatus is being transported, the anvil is raised from the ground by retracting the four hydraulic cylinder means 80 to 83. When the trailer has been properly position, the cylinder means lower the anvil to the ground and then apply the weight of the apparatus to urge the anvil plate to a generally horizontal ground-engaging position. The boom is then positioned with respect to impact-receiving surface 64, 66 or 68 depending upon the wave that is to be generated. The hammer is raised and then dropped to produce the seismic wave. The process is then repeated either at the same or at a different angle depending upon the exploration requirements.

Having described my invention, I claim:

1. An anvil useful for generating waves in the ground, comprising:

a body having a ground-engaging surface on the lower side thereof and impact receiving surface means on the upper side thereof, said impact-receiving surfaces including a pair of opposed impact-receiving surfaces each disposed in planes 90° apart and including a third impact-receiving surface being disposed parallel to the lower surface of said body and at a generally 45° relationship with respect to said opposed impact-receiving surfaces.

2. Apparatus for generating waves in the ground, comprising:

a frame;

an elongated, linear rigid boom movably mounted on the frame;

a hammer mounted on the boom for movement therealong;

an anvil mounted on the ground beneath the frame in a position thereto to be struck by the hammer, said anvil having a ground-engaging surface on the lower side thereof and impact-receiving surface means on the upper side thereof, said impact-receiving surface means including a pair of opposed impact receiving surfaces, disposed in planes about 90° apart;

cable means mounted on the boom and connected to the hammer for dropping it from an elevated position to strike the anvil;

positioning means mounted on the frame and connected to the boom for positioning it in a first position with respect to the frame to guide the hammer for a downward motion in a first direction toward the anvil, said positioning means being operative to move the boom with respect to the frame to a second position thereto to guide the hammer for a downward motion in a second direction toward the anvil whereby the hammer is operative to generate a wave in the ground by a downward motion in either said first direction or said second direction without repositioning the frame or the anvil with respect to the ground; and hydraulic means carried on the frame and connected to the anvil for applying a portion of the weight of the frame and the boom on the anvil to position it on the ground.

* * * * *

UNITED STATES PATENT AND TRADEMARK OFFICE
CERTIFICATE OF CORRECTION

PATENT NO. : 4,291,780
DATED : September 29, 1981
INVENTOR(S) : EARL FULKERSON

It is certified that error appears in the above-identified patent and that said Letters Patent are hereby corrected as shown below:

ON THE TITLE PAGE:

Cancel Title reading "Apparatus for Wires in the Ground"

and insert thereinstead --IMPROVED APPARATUS FOR GENERATING WAVES IN THE GROUND--.

Signed and Sealed this

Twenty-seventh Day of April 1982

[SEAL]

Attest:

Attesting Officer

GERALD J. MOSSINGHOFF
Commissioner of Patents and Trademarks